No. 656,153. Patented Aug. 14, 1900.
F. M. DANIELS.
EYEGLASSES.
(Application filed May 14, 1900.)

(No Model.)

Witnesses
George Ackman
Mrs. L. C. Coburn.

Inventor
Frank M. Daniels
By Victor J. Evans
Attorney

THE NORRIS PETERS CO., PHOTO-LITHO., WASHINGTON, D. C.

UNITED STATES PATENT OFFICE.

FRANK M. DANIELS, OF MANCHESTER, MARYLAND.

EYEGLASSES.

SPECIFICATION forming part of Letters Patent No. 656,153, dated August 14, 1900.

Application filed May 14, 1900. Serial No. 16,632. (No model.)

*To all whom it may concern:*

Be it known that I, FRANK M. DANIELS, a citizen of the United States, residing at Manchester, in the county of Carroll and State of Maryland, have invented certain new and useful Improvements in Eyeglasses, of which the following is a specification.

My invention relates to eyeglasses of the class known as "rimless" glasses, the object being to provide means for attaching the nose-spring to the lenses without the necessity of drilling holes through the lenses.

The construction of the improvement will be fully described hereinafter and defined in the appended claims, in connection with the accompanying drawings, which form a part of this specification.

Figure 1:
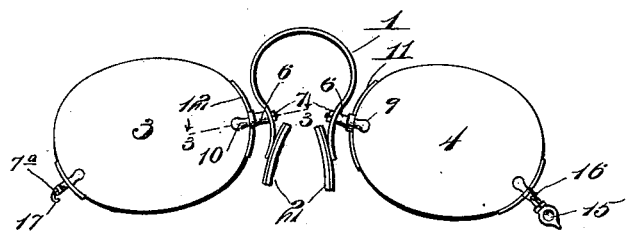
Figure 2:
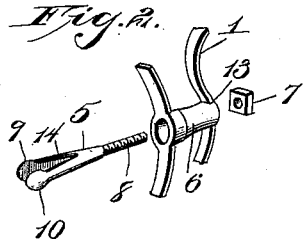

In the drawings, Figure 1 is a front elevation of a pair of glasses with my improvements applied thereto. Fig. 2 is a view in perspective of the parts of the clamping devices separated and shown on an enlarged scale, and Fig. 3 is a section on the line 3 3 of Fig. 1 on an enlarged scale.

The reference-numeral 1 designates the usual bow-spring of the glasses, to which are secured the nose-clamps 2, and 3 and 4 designate the lenses, which are secured to the spring 1 by clamping devices, each comprising a clip 5, a clamping-sleeve 6, and a nut 7.

Figure 3:
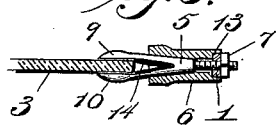

The clip 5 is screw-threaded at one end 8 and bifurcated at its opposite end to form clamping-jaws 9 and 10, the outer sides of which are inclined, as best shown in Fig. 3, to receive the thrust of the sleeve 6. The sleeves fit over the clips and are provided with oppositely-projecting curved braces 11 and 12, which fit upon the edges of the lenses. The inner ends of the sleeves 6 are recessed, as shown at 13, to receive the spring 1, and the threaded ends 8 of the clips extend through openings in the spring 1 and project a sufficient distance on the inner side of the spring to permit of the attachment of the nuts 7.

The inner surfaces of the jaws 9 and 10 are lined with rubber 14, which insures a tight frictional connection of the jaws with the lenses and also cushions the clamps to prevent breaking of the lenses when accidentally dropped.

The glasses may be provided with a handle or finger-piece 15, secured to one of the lenses by clamping devices embodying substantially the construction above described, the difference being that the nut 7 is formed with a loop or handle 15, and the sleeve 6 is provided with a pin 16 to engage a hook 17, projecting from the nut $7^a$ of a clamping device secured to the lens 3.

It will be clear from the foregoing description, in connection with the drawings, that the improved clamping devices may be used for securing both the nose-spring and the hook-and-pin attachments for holding the glasses in closed position.

The utility and manner of securing the clamping-jaws will be readily understood. By turning the nuts 7 the sleeve 6 compresses the jaws 9 and 10 into firm engagement with the lenses.

I claim—

1. Clamping devices for eyeglasses, comprising a clip screw-threaded at one end and bifurcated at its opposite end, a sleeve fitting over said clip and a nut for securing the sleeve upon the clip.

2. Clamping devices for eyeglasses, comprising a clip screw-threaded at one end, and bifurcated at its opposite end to form clamping-jaws, a sleeve fitting over said clip and formed with curved arms adapted to embrace the edges of the lenses, and a nut for securing the sleeve upon the clip.

3. The combination with rimless-eyeglass lenses, and the nose-spring thereof, of clamps comprising clips screw-threaded at their inner ends and bifurcated at their opposite ends and lined with rubber or like yielding material, to receive the lenses, sleeves fitting over said clips, and nuts for securing the sleeves in place upon the clips.

In testimony whereof I affix my signature in presence of two witnesses.

FRANK M. DANIELS.

Witnesses:
HARRY M. SMITH,
JACOB P. BALTOZER.